United States Patent [19]

Daumueller et al.

[11] Patent Number: 5,138,531
[45] Date of Patent: Aug. 11, 1992

[54] HEADLAMP FOR POWER VEHICLE

[75] Inventors: Hans Daumueller, Bodelshausen; Karl-Otto Dobler, Reutlingen; Heinz Ruckwied, Kusterdingen-Wankheim; Friedrich Schauwecker, Pfullingen, all of Fed. Rep. of Germany

[73] Assignee: Robert Bosch GmbH, Stuttgart, Fed. Rep. of Germany

[21] Appl. No.: 605,032

[22] Filed: Oct. 26, 1990

[30] Foreign Application Priority Data

Dec. 6, 1989 [DE] Fed. Rep. of Germany ....... 3940281

[51] Int. Cl.5 .............................................. B60Q 1/04
[52] U.S. Cl. ........................................ 362/66; 362/61; 362/418
[58] Field of Search ..................... 362/61, 66, 80, 269, 362/275, 418, 419; 33/288, 645

[56] References Cited

U.S. PATENT DOCUMENTS

| 3,612,854 | 10/1971 | Todd et al. | 362/269 |
|---|---|---|---|
| 4,660,128 | 4/1987 | Bergin et al. | 362/80 |
| 4,731,706 | 3/1988 | Ricard | 362/61 |
| 4,794,495 | 12/1988 | McMahan et al. | 362/66 |
| 4,916,583 | 4/1990 | Nagasawa | 362/61 |
| 4,984,136 | 1/1991 | Yamagishi et al. | 362/80 |

Primary Examiner—Ira S. Lazarus
Attorney, Agent, or Firm—Michael J. Striker

[57] ABSTRACT

A headlamp for a power vehicle has a reflector mountable on a power vehicle and displaceable relative to the latter, a light source provided in the reflector, an adjustment controller of the reflector, an adapter connectable with the reflector for testing the adjustment, and provided with at least a part of the adjustment controller.

12 Claims, 2 Drawing Sheets

HEADLAMP FOR POWER VEHICLE

BACKGROUND OF THE INVENTION

The present invention relates to a headlamp for a power vehicle. More particularly, it relates to such a headlamp which has a reflector provided with a light source and mounted on a chassis of a power vehicle displaceably relative to the latter.

Headlamps of the above mentioned general type are known in the art. One such headlamp is disclosed for example in the U.S. Pat. No. 3,612,854. The headlamp is displaceably arranged in a receptacle of a power vehicle chassis. The power vehicle has a left and a right headlamp, and between both headlamps a string or the like extends transversely to the longitudinal axis of the power vehicle. Means for controlling the adjustment of the reflector formed as markings are provided on each headlamp. With correct adjustment of the reflector they are oriented in a certain way relative to the string. For controlling the vertical adjustment of the reflector turnable about a horizontal transverse axis, each headlamp is provided with a water level. The headlamp adjustment by the string is however not suitable for practical use, since the string on the chassis forms a hindrance and a permanent tensioning of the string is not ensured, for example due to material changes. Moreover a correct adjustment of the headlamp is not guaranteed when the headlamp due to tolerances is mounted in different positions relative to the longitudinal axis and transverse axis of the power vehicle.

SUMMARY OF THE INVENTION

Accordingly, it is an object of the present invention to provide a headlamp which avoids the disadvantages of the prior art.

More particularly, it is an object of the present invention to provide a headlamp in which the above mentioned means for controlling the adjustment of the reflector are arranged in an adapter utilizable for several headlamps, and thereby no arrangement on the headlamp itself are necessary.

Moreover, it is also an object of the present invention to provide an independent adjustment for each headlamp by the adapter, so that a correct adjustment is insured.

In keeping with these objects and with others which will become apparent hereinafter, one feature of the present invention resides, briefly stated, in a headlamp in which at least a part of means for controlling adjustment of the reflector is arranged on an adapter connectable with a reflector for testing the adjustment.

When the headlamp is designed in accordance with the present invention is attains the above mentioned objects.

In accordance with another feature of the present invention, the adapter is formed so that instead of the light source, it can be inserted in a receptacle of the reflector. No special receptacle is needed on the reflector for the adapter and a height adjustment accuracy is achieved.

In accordance with a further feature of the present invention, the adapter is insertable in a receptacle of the reflector, which is oriented so that the eventual manufacturing tolerances of the reflector are compensated and the means arranged on the adapter indicate the adjustment required for a respective reflector. These features provide for a further increase of the adjustment accuracy.

In accordance with still another feature of the present invention the reference line is provided parallel to the longitudinal axis of the power vehicle, and the plain surface of the means is oriented in alignment with the reference line in the event of correct adjustment of the reflector. In this case no additional structural elements are needed for the adapter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
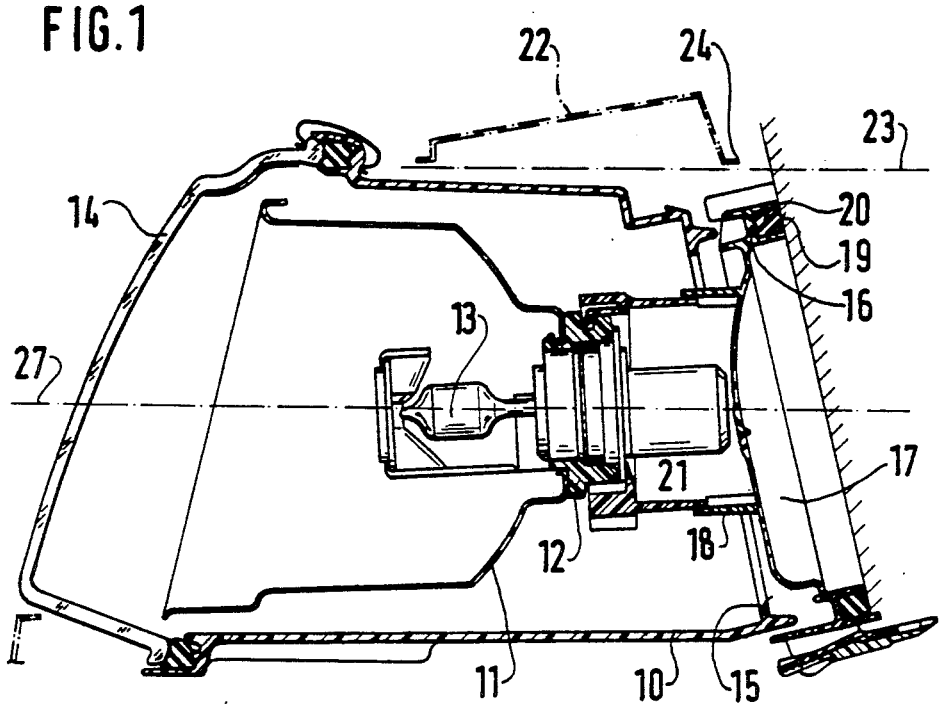
FIG. 1 is a view showing a longitudinal section of the headlamp with an adapter in accordance with first embodiment.

A headlamp shown in FIG. 1 is mounted on a chassis of a power vehicle. The headlamp has a housing 10 and a reflector 11 displaceable arranged in the housing. An incandescent lamp 13 is inserted in a lamp support 12 in the reflector 11 and more particularly in its apex region. The front side of the housing 10 is closed by a light disc 14. The housing 10 has an opening 15 in its rear side for exchanging the incandescent lamp 3. The opening 15 is closed by a cover cap 16 which is mounted in an opposite direction. It serves as an adapter 17 for controlling the adjustment of the reflector.

A connecting piece formed as a cylindrical projection 18 is formed on the cover cap 16 at its outwardly extending side. It has a plane surface 19 facing toward the housing 10 and formed by an edge of a ring groove for receiving a sealing ring 20. A cylindrical projection 21 is also formed on the lamp support 12. It extends toward the opening 15 and is closeable by the connecting piece 18 of cover cap 16 and secured against rotation. The projection 21 can also formed directly on the reflector and be prismatic, for receiving the cover cap 16 in a non-rotatable manner. The plain surface 19 extends outwardly beyond the housing 10 when the cover cap functioning as adapter 17 is in mounted condition. A transverse support 22 of the chassis extends over the headlamp and has a straight horizontal reference edge 24 which extends toward the cover cap 16 transversely to the longitudinal axis 23 of the power vehicle. With correct adjustment of the reflector in horizontal direction the plain surface 19 which when seen from above the reflector is an edge, extends parallel to the reference edge 24. With deviating orientation of the plain surface 19, the reflector 11 is adjusted by not shown adjusting element, until the parallelism is obtained.

Figure 2:
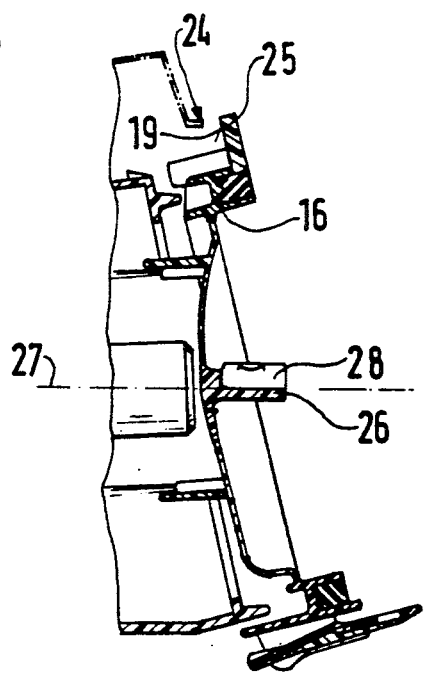
FIG. 2 is a view showing a further modification of the adapter of FIG. 1.

In the embodiment shown in FIG. 2 a receptacle 26 is formed on the cover cap 16 at the side of the plain surface 19. A water level 28 is arranged in the receptacle and extends parallel to the optical axis 27 of the reflector 11, for controlling the adjustment of the inclination of the reflector 11. The plain surface 19 is arranged here on a projection 25 which is formed on the cover cap and acts in its operational position as the adapter 17 to the edge 24. With correct adjustment of the reflector the plain surface 19 extends parallel to the edge 24.

Figure 3:
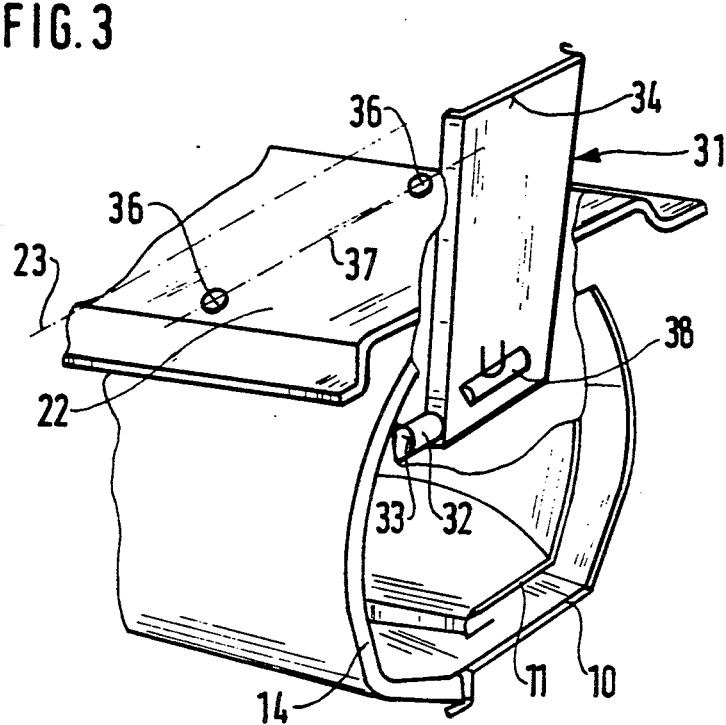
FIG. 3 is a view showing a second modification of the adapter.

FIG. 3 shows a second embodiment of the adapter 31. Here, a cylindrical mandrel 32 is formed on the adapter 31, through which the adapter is insertable in an opening 33 in a receptacle formed on the reflector. The opening 33 extends parallel to the optical axis 27 of the reflector and the mandrel 32 is rotatable in the opening 33. Also, a plain surface 34 is arranged on the adapter 31 and extends parallel to the optical axis 27 of the reflector. Two markings 36 are provided on a transverse support 22 of the chassis and particularly on its upper side. They define a reference line 37 extending parallel to the longitudinal axis 23 of the power vehicle. The markings 36 are formed for example by depressions. With correct adjustment of the reflector in a horizontal direction, or in other words in the lateral direction, the plain surface 34 is oriented in alignment with the reference line 37. By rotation of the adapter 31 the lateral offset between the opening 33 and the reference line 37 due to tolerances of the headlamp or the chassis can be compensated. For controlling the adjustment of the inclination of the reflector 11 a water level is again provided in the adapter.

For compensating eventual manufacturing tolerances of the reflector 11, which require an inclination of the reflector deviating from a central inclination for a light bundle producing a correct reflection from the reflector, the opening 33 is first provided during optical testing of the reflector 11 after the final mounting of the headlamp. During this testing the reflector 11 is so adjusted that the reflection of the light bundle is obtained in a predetermined direction, and with this adjustment the reflector 11 is mounted in the opening 33.

Figure 4:
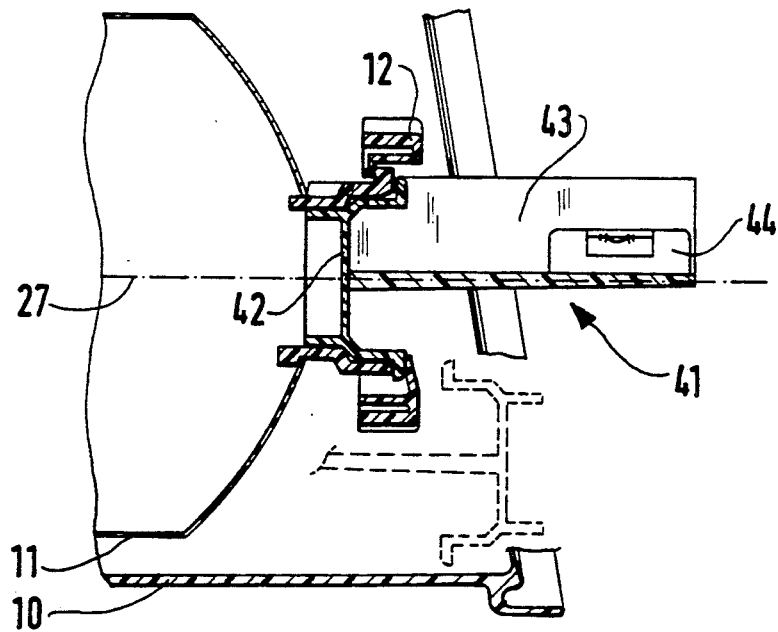
FIG. 4 is a view showing a third modification of the adapter.

In the embodiment shown in FIG. 4 the adapter 41 has a connecting part 42. This part is formed so that instead of the incandescent lamp 13 it is insertable in the lamp support 12. A water level 44 is arranged on a support 43 of the adapter 41, extending substantially parallel to the optical axis 27 of the reflector 11. After adjusting the reflector 11, the adapter 41 can be stored on the housing 10 of the headlamp so that it is easily available for an eventual control of the adjustment.

The adapter described in the above specified embodiments can be used for both headlamps of a power vehicle, so that for each power vehicle only one adapter is needed.

It will be understood that each of the elements described above, or two or more together, may also find a useful application in other types of constructions differing from the types described above.

While the invention has been illustrated and described as embodied in a headlamp for a power vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by Letters Patent is set forth in the appended claims:

1. A headlamp for a power vehicle, comprising a reflector mountable on a power vehicle and displaceable relative to the latter, said reflector having a rear side provided with a receptacle; a light source provided in said reflector; means for controlling adjustment of said reflector; an adapter connectable with said reflector for testing the adjustment, at least a part of said means for controlling adjustment being arranged on said adapter; a housing accommodating said reflector and having a rear side provided with a rear opening, so that said adapter is insertable through said rear opening of said housing into said receptacle of said reflector and said means for controlling adjustment arranged on said adapter being located outside said housing when said adapter is inserted in said receptacle.

2. A headlamp as defined in claim 1, wherein said reflector is adapted to receive said light source, said adapter being formed so that it can be inserted in said receptacle instead of said light source.

3. A headlamp as defined in claim 1, wherein said receptacle is oriented so as to compensate eventual manufacturing tolerances of said reflector, said means for controlling adjustment arranged on said adapter indicating an adjustment required for a respective reflector.

4. A headlamp as defined in claim 3, wherein said receptacle is formed as an opening, said adapter having a cylindrical mandrel insertable in said opening.

5. A headlamp as defined in claim 1; and further comprising a cover cap adapted to close said rear opening of said housing, said cover cap having an outer side provided with a shaped piece forming a connecting part, said reflector having a respective connecting part connectable with said first mentioned connecting part and formed as said adapter.

6. A headlamp as defined in claim 5, wherein said connecting parts are formed as plug parts.

7. A headlamp as defined in claim 1, wherein said part of said means for controlling adjustment on said adapter is formed as a plain surface, said means for controlling adjustment including another part including a marked reference line adapted to be provided on a part of a chassis, said plain surface extending with correct adjustment of the reflector in a lateral direction parallel to said other part of said means.

8. A headlamp as defined in claim 7, wherein said reference line is formed as a straight horizontal reference edge of a part of a chassis, extending transverse to a longitudinal axis of the power vehicle.

9. A headlamp as defined in claim 7, wherein said reference line extends substantially parallel to a longitudinal axis of the power vehicle, and the plain surface in correct adjustment of said reflector is oriented in alignment with said reference line.

10. A headlamp as defined in claim 1, wherein said means for controlling adjustment also includes a water level in said adapter.

11. A headlamp for a power vehicle, comprising a reflector mountable on a power vehicle and displaceable relative to the latter; a light source provided in said reflector; means for controlling adjustment of said reflector; an adapter connectable with said reflector for testing the adjustment, at least a part of said means for controlling adjustment being arranged on said adapter;

a housing having a rear opening; a cover cap adapted to close said rear opening of said housing, said reflector being arranged in said housing, said cover cap having an outer side provided with a shaped piece forming a connecting part, said reflector having a receptacle with a respective connecting part connectable with said first mentioned connecting part and formed as said adapter.

12. A headlamp as defined in claim 11, wherein said connecting parts are formed as plug parts.

* * * * *